（12）United States Patent
Imanishi et al.

(10) Patent No.: US 10,826,091 B2
(45) Date of Patent: Nov. 3, 2020

(54) FUEL CELL AND FUEL CELL DEVICE HAVING VOLTAGE-DETECTION CELL COONECTOR RECEIVING PORTION

(71) Applicant: TOYOTA JIDOSHA KABUSHIKI KAISHA, Toyota-shi (JP)

(72) Inventors: Masahiro Imanishi, Toyota (JP); Nobuaki Nonoyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 16/178,782

(22) Filed: Nov. 2, 2018

(65) Prior Publication Data

US 2019/0165391 A1 May 30, 2019

(30) Foreign Application Priority Data

Nov. 28, 2017 (JP) ................. 2017-227374

(51) Int. Cl.
| | |
|---|---|
| *H01M 8/04* | (2016.01) |
| *H01M 8/04537* | (2016.01) |
| *H01M 8/0247* | (2016.01) |
| *H01M 8/026* | (2016.01) |
| *H01M 8/0284* | (2016.01) |
| *H01M 8/2483* | (2016.01) |
| *H01M 8/2432* | (2016.01) |
| *H01M 8/0202* | (2016.01) |
| *H01M 8/2465* | (2016.01) |
| *H01M 8/2484* | (2016.01) |

(52) U.S. Cl.
CPC ..... *H01M 8/04552* (2013.01); *H01M 8/0202* (2013.01); *H01M 8/026* (2013.01); *H01M 8/0247* (2013.01); *H01M 8/0284* (2013.01); *H01M 8/2432* (2016.02); *H01M 8/2465* (2013.01); *H01M 8/2483* (2016.02); *H01M 8/2484* (2016.02)

(58) Field of Classification Search
CPC ........... H01M 8/04552; H01M 8/2483; H01M 8/2432; H01M 8/0202; H01M 8/2465; H01M 8/0247; H01M 8/026; H01M 8/0284; H01M 8/2484
USPC ....................................................... 429/432
See application file for complete search history.

(56) References Cited

U.S. PATENT DOCUMENTS

| | | | |
|---|---|---|---|
| 2003/0076110 A1* | 4/2003 | Wang ................ | H01M 8/04671 324/444 |
| 2009/0136822 A1* | 5/2009 | Aoto ...................... | H01M 8/02 429/434 |

FOREIGN PATENT DOCUMENTS

| | | |
|---|---|---|
| JP | 2007200633 A | 8/2007 |
| JP | 2007220338 A | 8/2007 |

* cited by examiner

*Primary Examiner* — Gary D Harris
(74) *Attorney, Agent, or Firm* — Dickinson Wright PLLC

(57) ABSTRACT

A fuel cell that can have a voltage-detection cell connector reliably held thereon without the thickness of the fuel cell increased to a thickness of greater than that originally required to generate power. The fuel cell includes a recess portion in which a cell connector is adapted to be inserted. In the recess portion, a guide portion, which can guide a cell connector being inserted into the recess portion, is formed of a part of a separator (or a second extending portion thereof). In a portion of the recess portion opposite the second extending portion, a protrusion that forms a part of an insulating resin sheet, which is arranged between a pair of separators, protrudes toward the second extending portion. A to-be-crimped portion of the cell connector inserted in the recess portion is pressed against the second extending portion by the protrusion so that its stable posture is held.

6 Claims, 10 Drawing Sheets

FUEL CELL AND FUEL CELL DEVICE HAVING VOLTAGE-DETECTION CELL COONECTOR RECEIVING PORTION

CROSS REFERENCE TO RELATED APPLICATIONS

The present application claims priority from Japanese patent application JP 2017-227374 filed on Nov. 28, 2017, the content of which is hereby incorporated by reference into this application.

BACKGROUND

Technical Field

The present disclosure relates to a fuel cell that can have attached thereto a voltage-detection cell connector used for detecting a cell voltage, and a fuel cell device including a stack of a plurality of such fuel cells.

Background Art

A fuel cell device is typically formed as a stacked structure of a plurality of fuel cells that are called unit cells. A fuel cell that is a unit cell has a membrane electrode assembly (MEA) including an electrolyte membrane and an anode and a cathode provided on opposite sides of the electrolyte membrane, and is formed in a substantially rectangular shape in a plan view. The fuel cell also includes a pair of separators sandwiching the anode and the cathode therebetween.

The separator includes at least a fuel gas manifold for supplying fuel gas, such as hydrogen gas, to the anode, and an oxidant gas manifold for supplying oxidant gas, such as oxygen gas, to the cathode.

The separator has a function of a cell electrode, and a cell connector with a terminal is attached to a part of the separator (a part extending to the outside from the power-generating region) to detect a voltage of the fuel cell. JP 2007-200633 A or JP 2007-220338 A describes an example of an attachment structure for attaching such a cell connector to a fuel cell.

In the attachment structure described in JP 2007-200633 A, a mating part formed on a cell connector is mated with a mating part on the fuel cell side so that the cell connector can be attached to the fuel cell side. Meanwhile, in the attachment structure described in JP 2007-220338 A, a bulging portion that bulges in the thickness direction of a fuel cell is formed on one of a pair of separators that form the fuel cell, and a cell connector is fixedly inserted between adjacent separators and the bulging portion. That is, the cell connector is fixedly sandwiched in the thickness direction of the fuel cell.

SUMMARY

In the conventional attachment structure for attaching a cell connector to a fuel cell; the thickness of the fuel cell is unavoidably increased. This is because in the attachment structure described in JP 2007-200633 A, since the mating part formed on the cell connector is mated with the mating part on the fuel cell side, the thickness of a resin frame that forms the mating part should be increased to avoid deformation of the mating part. Meanwhile, in the attachment structure described in JP 2007-220338 A, since a cell connector to be inserted between adjacent separators is fixed utilizing a bulging portion, which bulges in the thickness direction, formed on one of the separators, the thickness of the fuel cell is unavoidably increased by an amount corresponding to the width of the bulging portion.

The present disclosure has been made in view of the foregoing, and provides a fuel cell that can have a voltage-detection cell connector reliably held thereon without the thickness of the fuel cell increased to a thickness of greater than that originally required to generate power. In addition, the present disclosure provides a fuel cell device obtained by stacking a plurality of such fuel cells.

A fuel cell in accordance with the present disclosure is a fuel cell adapted to have attached thereto a voltage-detection cell connector used for detecting a cell voltage, the fuel cell including a membrane electrode assembly; a pair of separators sandwiching the membrane electrode assembly therebetween; a recess portion in which the cell connector is adapted to be inserted; a plate-like guide portion located on a side of the recess portion, the plate-like guide portion extending in a direction of insertion of the cell connector and serving as a guide for the cell connector when the cell connector is inserted into the recess portion; a resin sheet arranged between the pair of separators; and a pressing member formed of a part of the resin sheet, the pressing member protruding into the recess portion at a position that is opposite the guide portion and at which the pressing member is adapted to press a part of the cell connector inserted into the recess portion toward the guide portion.

In the fuel cell in accordance with the present disclosure, the lower side of the cell connector inserted into the recess portion is supported by the guide portion formed in the recess portion, and in such a state, a part of the cell connector is pressed by the pressing member that forms a part of the resin sheet arranged between the pair of separators and protrudes into the recess portion. Accordingly, the attached posture of the cell connector is stabilized. In addition, each of the guide portion and the pressing member is in the form of a plate that merely protrudes in the plane direction of the fuel cell, and thus, the thickness of the fuel cell does not increase due to the guide portion or the pressing member.

In some embodiments of the fuel cell of the present disclosure, opposite sides of the proximal side of a portion of the resin sheet that forms the pressing member are sandwiched between the pair of separators.

In some embodiments of the fuel cell in accordance with the present disclosure, the guide portion and the pressing member may be formed as separate dedicated members for the fuel cell. However, in some embodiments, from the perspective of further simplifying the structure, the guide portion is formed of a part of the separator, and the pressing member is formed of a part of an insulating resin sheet arranged between the pair of separators to seal a space between the pair of separators.

In some embodiments of the fuel cell in accordance with the present disclosure, at least a fuel gas manifold and an oxidant gas manifold are provided on the peripheral edge of the fuel cell, and the recess portion is arranged in proximity to the fuel gas manifold.

The present disclosure also discloses a fuel cell device including a stack of a plurality of such fuel cells.

According to the present disclosure, there are provided a fuel cell that can have a voltage-detection cell connector reliably held thereon without the thickness of the fuel cell increased to a thickness of greater than that originally required to generate power, and a fuel cell device obtained by stacking a plurality of such fuel cells.

DETAILED DESCRIPTION

Figure 1:
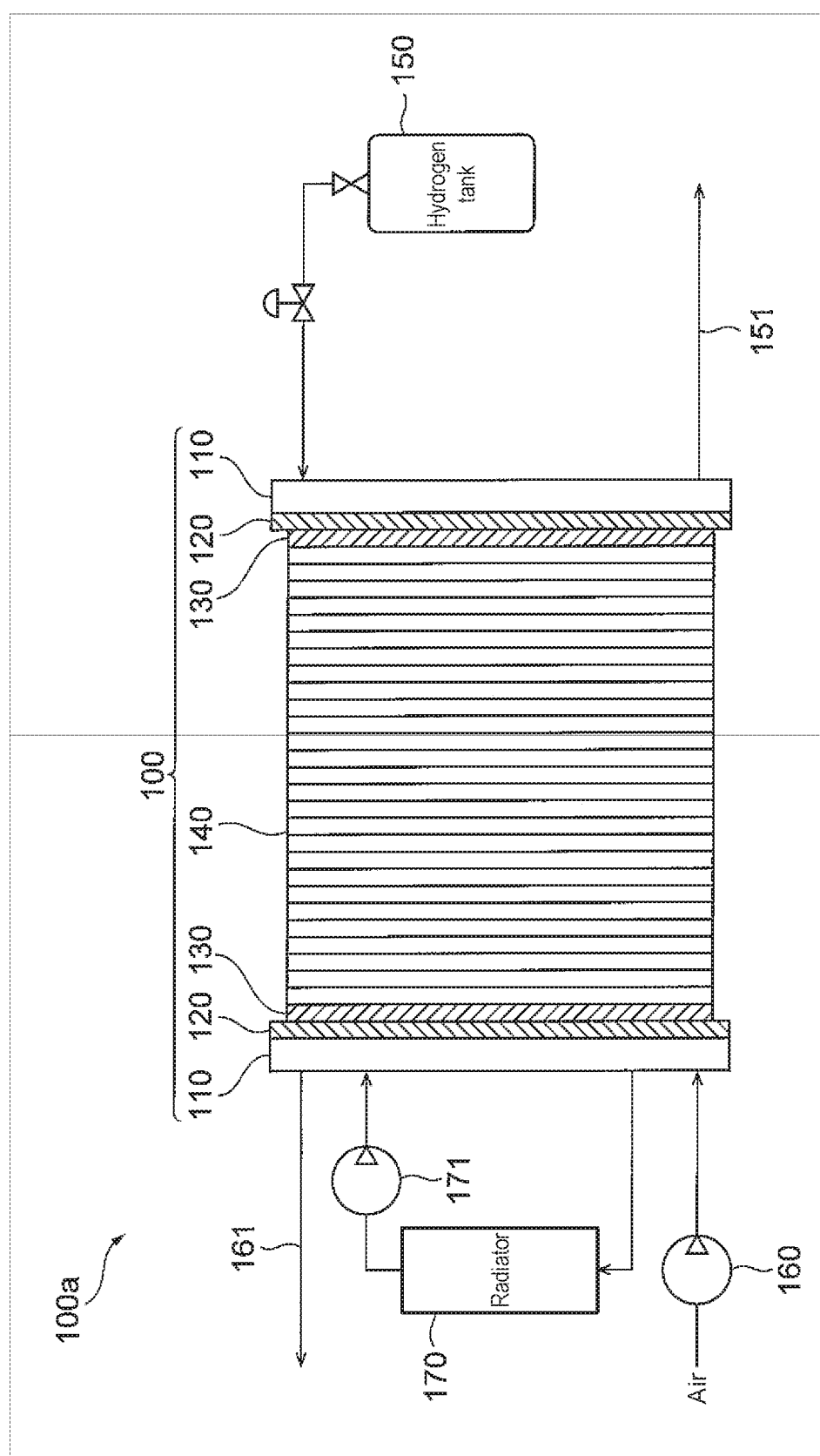
FIG. 1 is an illustration view of a schematic structure of a fuel cell system.

Hereinafter, an embodiment of the present disclosure will be described with reference to the drawings. First; a schematic structure of a fuel cell system that uses fuel cells of this embodiment will be described.

A fuel cell system 100a includes a fuel cell stack 100 as a stack of fuel cells. The fuel cell stack 100 is a stacked structure having an end plate 110, an insulating plate 120, a current collector 130, a plurality of fuel cells 140, a current collector 130, an insulating plate 120, and an end plate 110 that are stacked in this order. The fuel cell stack 100 is supplied with hydrogen as fuel gas from a hydrogen tank 150 that has high-pressure hydrogen stored therein. Fuel gas (anode off-gas) that has not been used in the fuel cell stack 100 is discharged to the outside of the fuel cell stack 100 via a discharge pipe 151. In addition, air is supplied as oxidant gas to the fuel cell stack 100 via an air pump 160. Oxidant gas (cathode off-gas) that has not been used in the fuel cell stack 100 is discharged to the outside of the fuel cell stack 100 via a discharge pipe 161.

Further, a cooling medium, which has been cooled by a radiator 170, is supplied to the fuel cell stack 100 via a water pump 171 so as to cool the fuel cell stack 100. The cooling medium discharged from the fuel cell stack 100 is circulated to the radiator 170 via a pipe. As the cooling medium, for example, water, unfreezable water such as ethylene glycol, or air is used.

Figure 2:
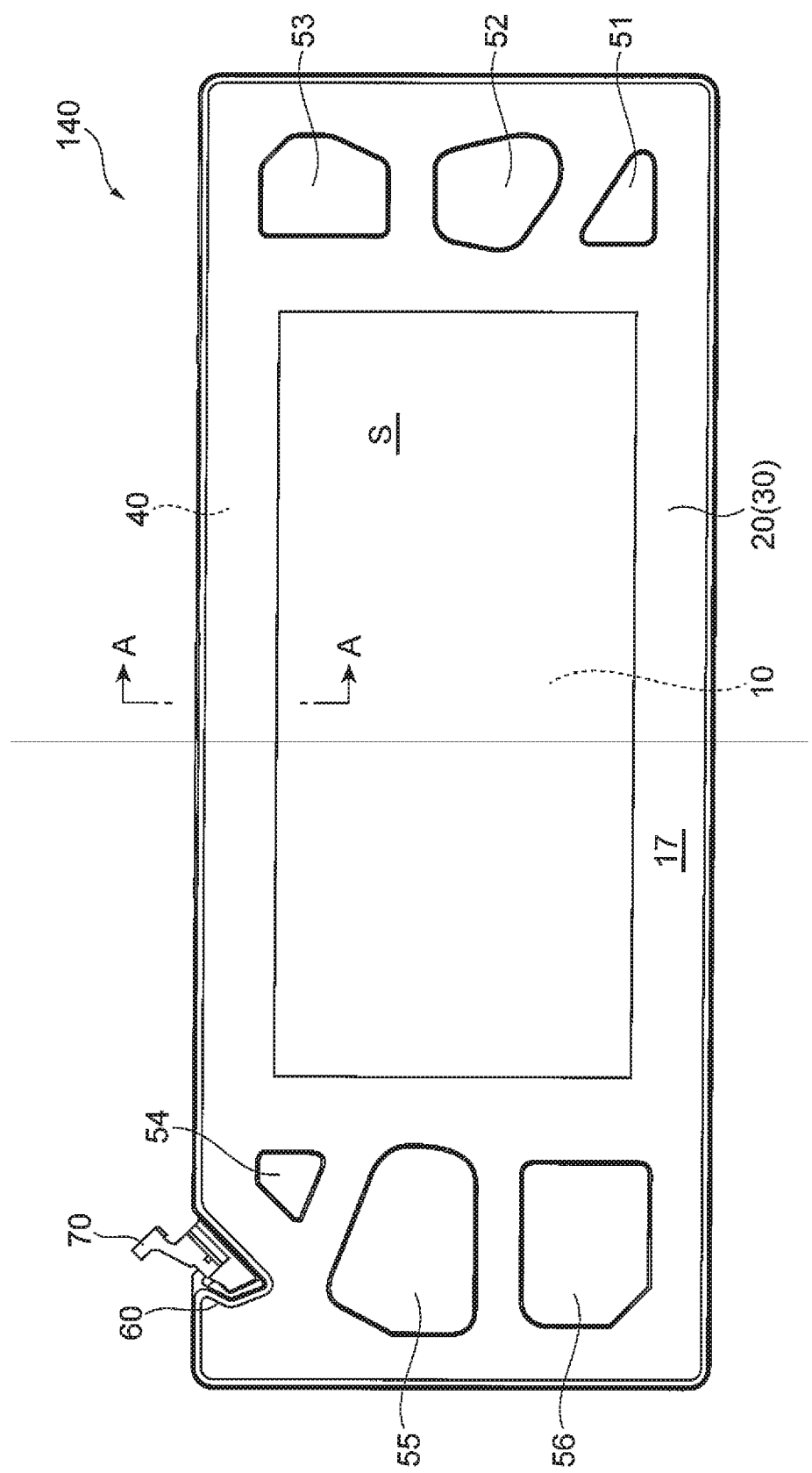
FIG. 2 is a plan view of a fuel cell of an embodiment.
Figure 3:
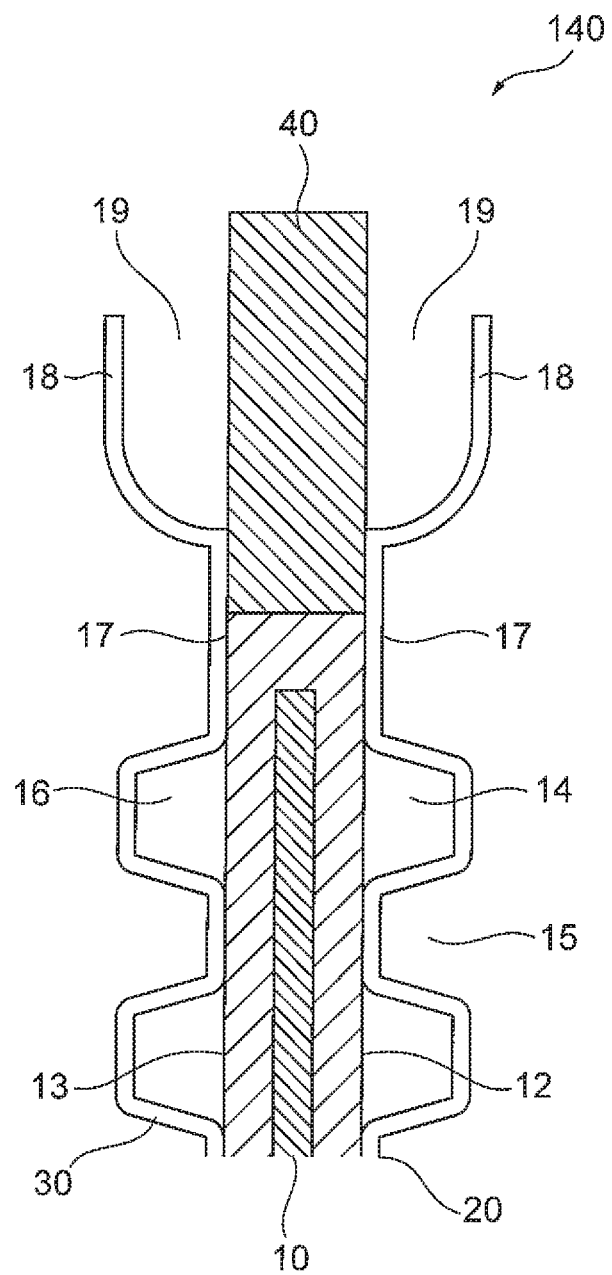
FIG. 3 is a schematic view of a cross-section along line A-A of FIG. 2.

Each fuel cell 140 of the fuel cell stack 100 includes, as illustrated in FIG. 3 that is a schematic cross-sectional view along line A-A of FIG. 2 described below, a membrane electrode assembly (MEA) 10 serving as a power-generating module and a pair of separators 20, 30 sandwiching the membrane electrode assembly 10 therebetween. Diffusion layers 12, 13 are provided between the membrane electrode assembly 10 and the separators 20, 30, respectively. In this example, the anode-side separator 20 includes a plurality of thread-like fuel-gas flow channel grooves 14 on a plane on the side of the membrane electrode assembly 10, and a plurality of thread-like cooling-medium flow channel grooves 15 on a plane on the side opposite to the membrane electrode assembly 10. The cathode-side separator 30 on the other side includes a plurality of thread-like oxidant-gas flow channel grooves 16 on a plane on the side of the membrane electrode assembly 10.

Each fuel cell 140 includes an insulating resin sheet 40, which is arranged outside (on the outer periphery) of the membrane electrode assembly 10 sandwiched between the anode-side separator 20 and the cathode-side separator 30, along the plane direction thereof. The resin sheet 40 is molded into a plate shape and a frame shape using thermoplastic resin, and is used to seal a space between the anode-side separator 20 and the cathode-side separator 30 while the membrane electrode assembly 10 is held in the central region thereof. For the resin sheet 40, for example, resin such as PE, PP, PET, or PEN can be used.

FIG. 2 is a schematic plan view of the fuel cell 140. A region indicated by symbol S of the central portion is a region corresponding to the membrane electrode assembly 10, and is a power-generating region S. The aforementioned fuel-gas flow channel grooves 14 and oxidant-gas flow channel grooves 16 are formed around regions of the anode-side separator 20 and the cathode-side separator 30, respectively, that are opposite the power-generating region S, thereby forming irregular planes. The aforementioned insulating resin sheet 40 is located on the outer peripheral side of the power-generating region S. Each of the anode-side separator 20 and the cathode-side separator 30 around a region of the resin sheet 40 has a flat plane 17, and the resin sheet 40 is sandwiched between the pair of separators 20, 30.

As illustrated in FIG. 3, around an outer peripheral edge of the resin sheet 40 between the anode-side separator 20 and the cathode-side separator 30, there are provided expanded open portions 18 that are open in an expanded manner from the portions of the flat planes 17 up to almost the same heights of the fuel-gas flow channel grooves 14 and the oxidant-gas flow channel grooves 16, and gaps 19 are formed between the resin sheet 40 and the expanded open portions 18. In addition, the resin sheet 40 extends outward slightly beyond the tip ends of the expanded open portions 18.

In the flat plane 17 that is a non-power-generating region of the fuel cell 140, an inlet-side fuel gas manifold 51, a cooling-medium output manifold 52, and an inlet-side oxidant gas manifold 53 are formed on one end side of the fuel cell 140. Meanwhile, an outlet-side fuel gas manifold 54, a cooling-medium inlet manifold 55, and an outlet-side oxidant gas manifold 56 are formed on the other end side thereof.

Fuel gas supplied via a pipe is distributed to the fuel-gas flow channel grooves 14 (FIG. 3) of each fuel cell 140 by the inlet-side fuel gas manifold 51. After that, fuel gas that has not been used in the fuel-gas flow channel grooves 14 is collected by the outlet-side fuel gas manifold 54 and is discharged to the outside of the fuel cell stack 100. Meanwhile, oxidant gas supplied via a pipe is distributed to the oxidant-gas flow channel grooves 16 (FIG. 3) of each fuel cell 140 by the inlet-side oxidant gas manifold 53. Then, oxidant gas that has not been used in the oxidant-gas flow channel grooves 16 is collected by the outlet-side oxidant gas manifold 56, and is discharged to the outside of the fuel cell stack 100 via a pipe.

A cooling medium supplied via a cooling medium pipe is distributed to the cooling-medium flow channel grooves 15 (FIG. 3) of each fuel cell 140 by the cooling-medium inlet manifold 55. After that, the cooling medium is collected by the cooling-medium outlet manifold 52, and is discharged to the outside of the fuel cell stack 100 via a pipe.

Usually, in order to operate a fuel cell device, it is common to use hydrogen gas as fuel gas and air as oxidant gas. Therefore, the amount of air is larger than that of hydrogen gas supplied to the fuel cell during the operation. Thus, the areas of the openings of the fuel gas manifolds 51, 54 can be set smaller than those of the openings of the oxidant gas manifolds 53 and 56. Therefore, larger spaces can be secured around the fuel gas manifolds 51 and 54 than those around the oxidant gas manifolds 53 and 56.

In the fuel cell 140 of this embodiment, a recess portion 60 that is a cutout portion is formed in a portion of the large space secured around the outlet-side fuel gas manifold 54, and a voltage-detection cell connector 70 used for detecting a cell voltage is inserted into the recess portion 60. Hereinafter, the structure thereof will be described in detail.

Figure 4:
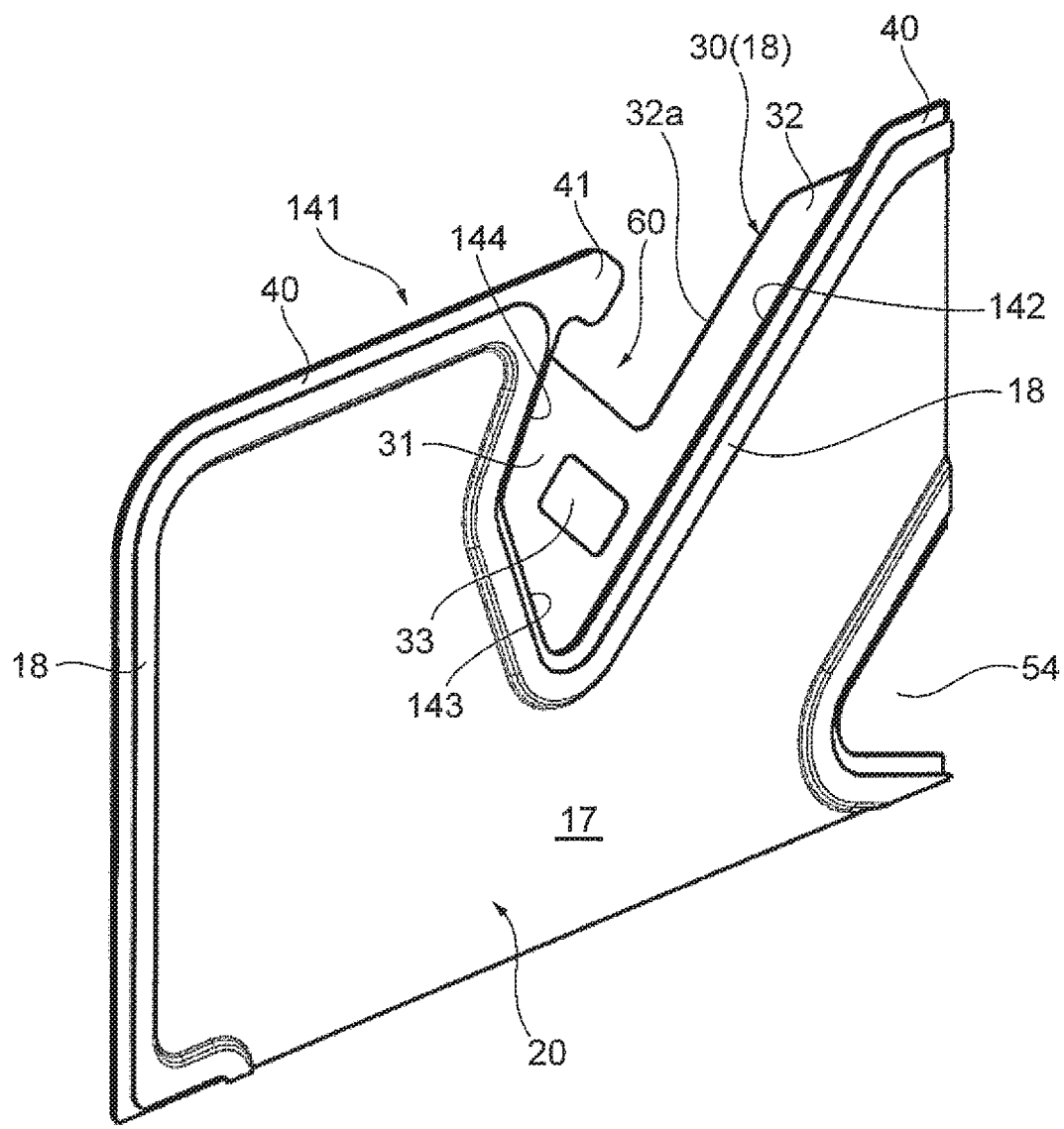
FIG. 4 is an enlarged perspective view of the periphery of a recess portion in which a cell connector of a fuel cell of an embodiment is adapted to be inserted.
Figure 5:
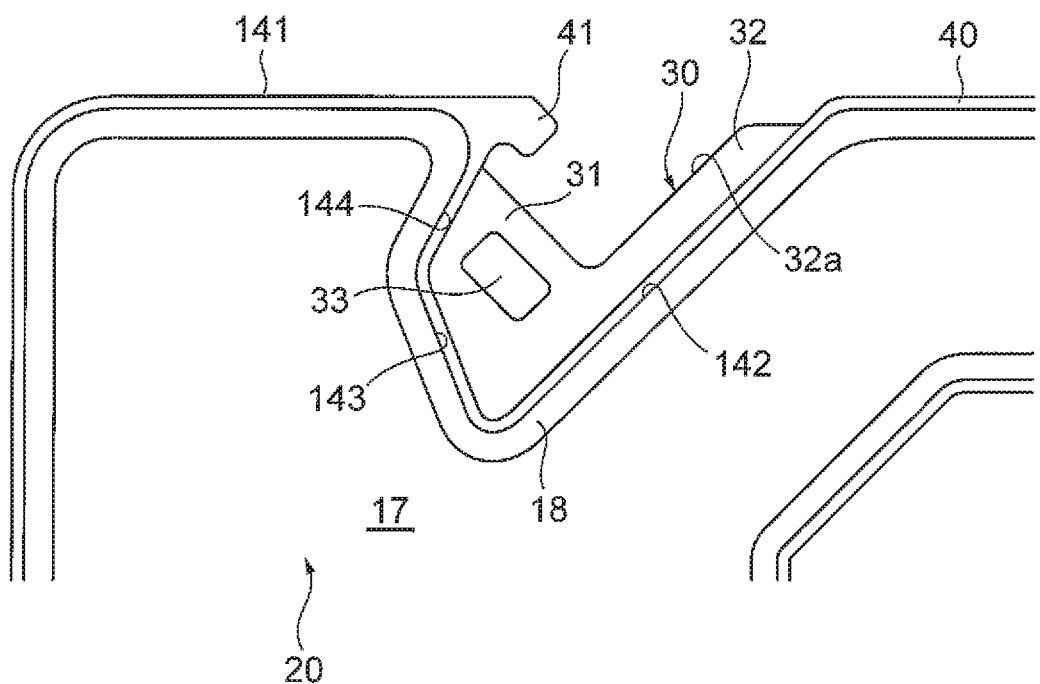
FIG. 5 is a plan view of a region illustrated in FIG. 4.
Figure 6:
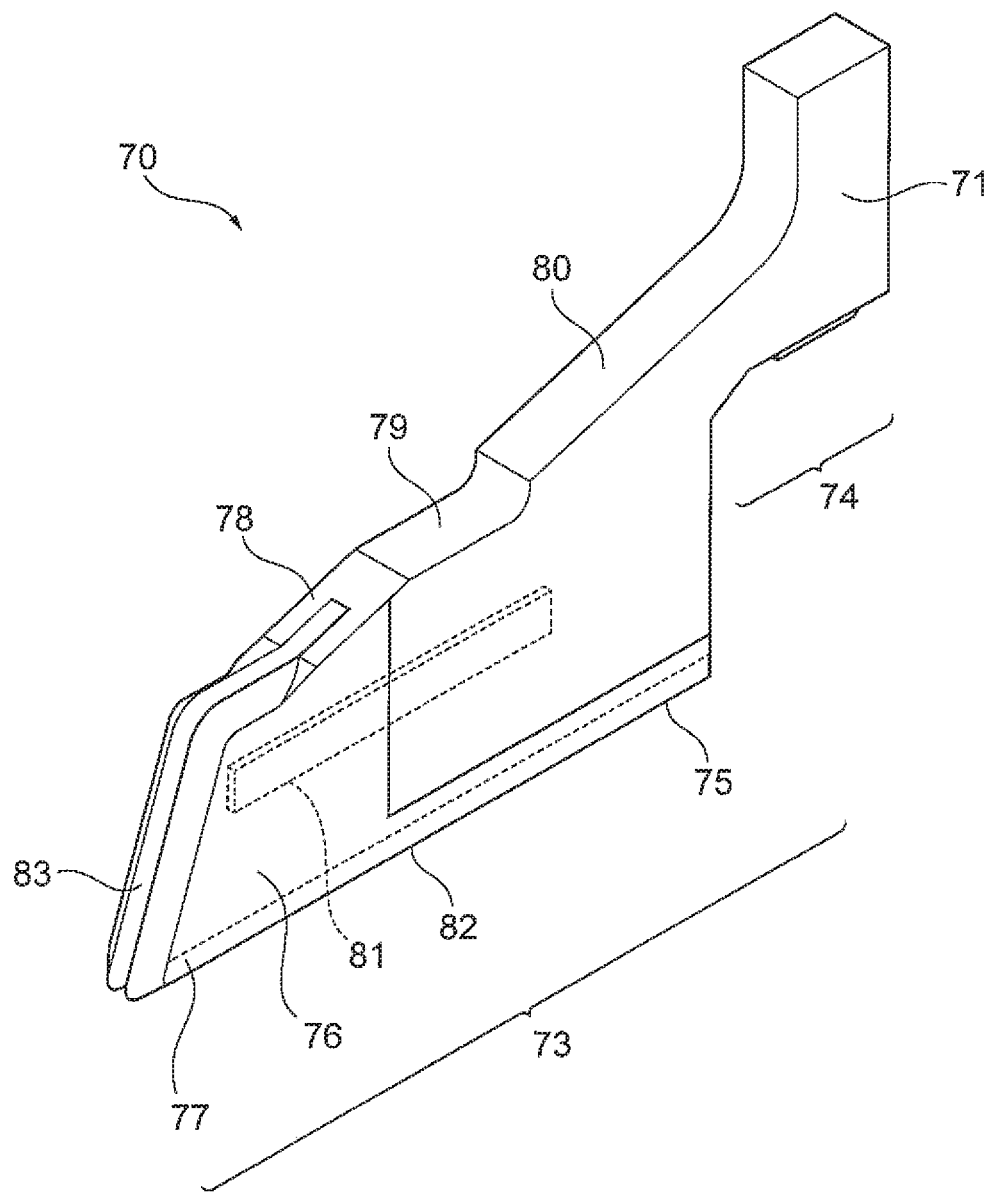
FIG. 6 is a perspective view of a cell connector.

FIG. 4 is an enlarged perspective view of the periphery of the recess portion 60 of the fuel cell 140 in which the cell connector 70 is adapted to be inserted, and FIG. 5 is a plan view thereof. FIG. 6 is a perspective view of the cell connector 70 that can be inserted in the recess portion 60.

As illustrated in FIG. 4 and FIG. 5, in this embodiment, the recess portion 60 is a region surrounded by a first side portion 142 inclined obliquely downward at an angle of about 45 degrees from a side (hereinafter referred to as a top side for the sake of convenience) 141 of the fuel cell 140, a second side portion 143 that rises obliquely upward from the lower end of the first side portion 142 toward the top side 141, and a third side portion 144 that extends from the upper end side of the second side portion 143 toward the top side 141.

Figure 7:
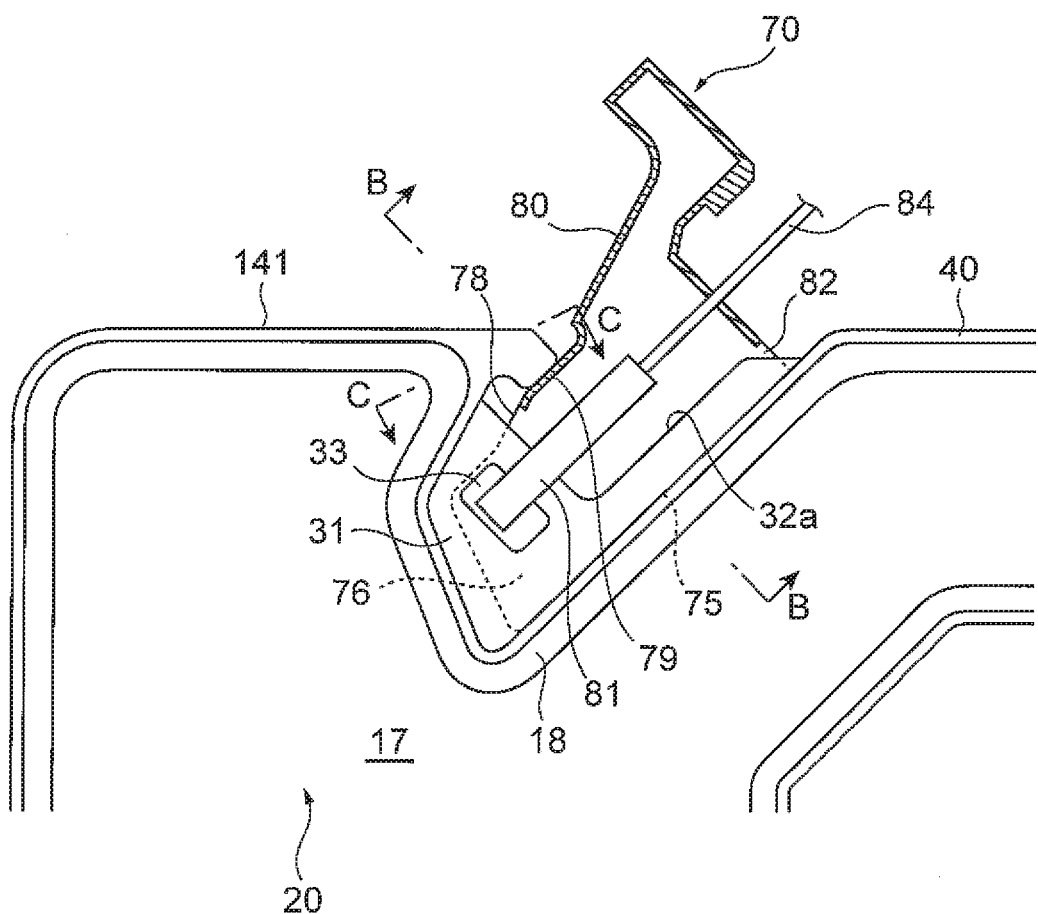
FIG. 7 is a plan view illustrating a state in which a cell connector is inserted in a recess portion of a fuel cell.
Figure 8:
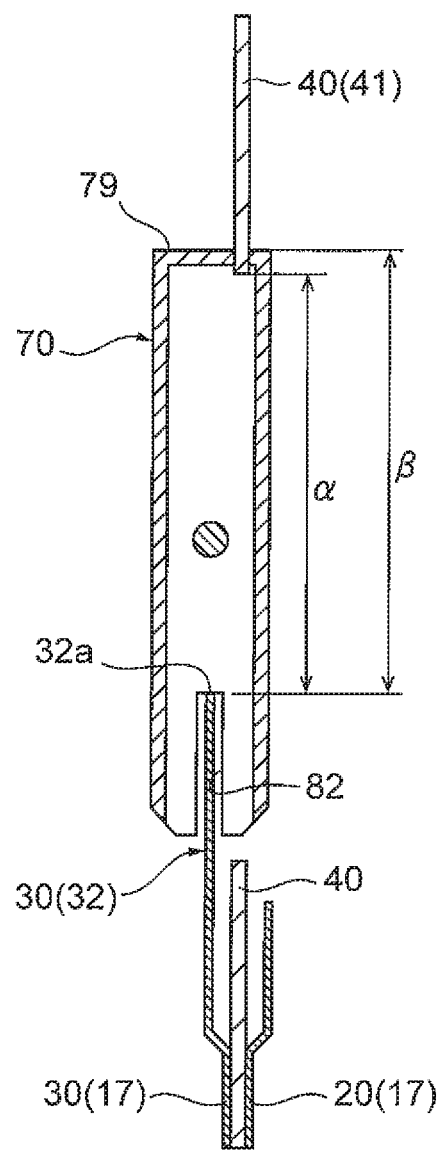
FIG. 8 is a cross-sectional view along line B-B of FIG. 7.
Figure 9:
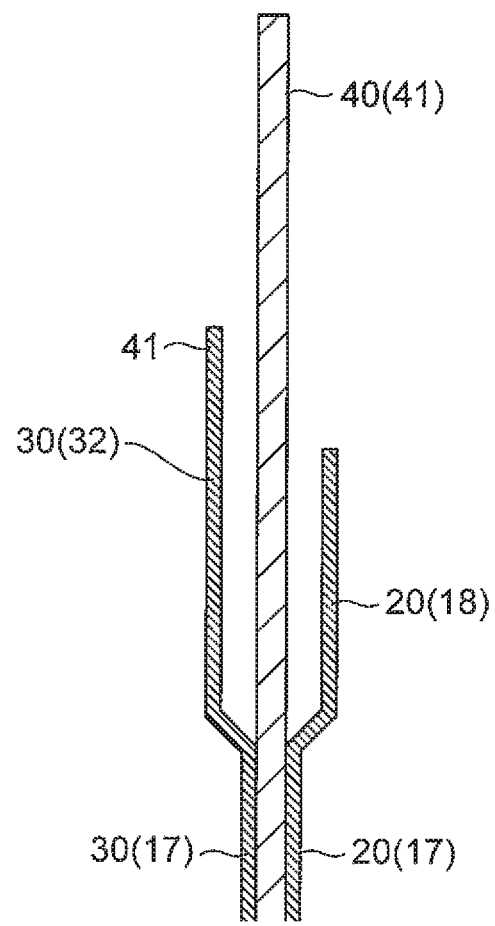
FIG. 9 is a cross-sectional view along line C-C of FIG. 7.

As illustrated in FIG. 4, the separator 20 on one side is partially cut out along the first side portion 142, the second side portion 143, and the third side portion 144 of the recess portion 60, and the expanded open portion 18 is formed along the cutout portion. In addition, as clearly illustrated in FIG. 8 that is a cross-sectional view along line B-B of FIG. 7 illustrating the state in which the cell connector 70 is inserted in the recess portion 60, and FIG. 9 that is a cross-sectional view along line C-C of FIG. 7, the resin sheet 40 partially extends outward along the cutout portion. It should be noted that in FIG. 7, the cell connector 70 is illustrated in a cross-section, and a conductive wire 84 for connection to the terminal 81 is also illustrated.

The expanded open portion 18 of the separator 30 on the other side includes a first extending portion 31 that extends to a region surrounded by the lower portion of the first side portion 142, the second side portion 143; and the third side portion 144 of the recess portion 60; and a second extending portion 32 that extends along the first side portion 142 from the lower region of the first extending portion 31. The upper edge 32a of the second extending portion 32 is parallel with the first side portion 142. A bulging portion 33 functioning as a stopper is formed on a portion of the first extending portion 31.

A part of the resin sheet 40 sandwiched between the flat planes 17, 17 of the pair of separators 20, 30 includes a protrusion 41 that greatly protrudes toward the side of the first side portion 142 from the tip end side of the third side portion 144 of the recess portion 60, and the lower side of the protrusion 41 bulges toward the side of the first side portion 142. The separator 20, the resin sheet 40, the protrusion 41 thereof, and the separator 30 are stacked in this order from the front surface side to the rear surface side in FIGS. 4 and 5.

Next; the cell connector 70 adapted to be inserted into the recess portion 60 will be described. FIG. 6 is a perspective view of an example of the cell connector 70. The cell connector 70 includes a flat casing 71. The casing 71 includes a body portion 73 with a shape conforming to the shape of the recess portion 60 formed in the fuel cell 140, and a knob portion 74 located at one end of the body portion 73.

The body portion 73 includes a linear base region 75, and a tip end region 76 that is the tip end side of the base region 75. The tip end 77 of the tip end region 76 has an acute angle. The upper edge side of the tip end region 76 includes a front inclined plane 78 that is inclined obliquely upward with respect to the linear base region 75, a to-be-crimped portion 79 that extends from the upper end of the front inclined plane 78 so as to be in parallel with the linear base region 75, and a rear inclined plane 80 that extends obliquely upward from the rear end of the to-be-crimped portion 79. The rear inclined plane 80 is continuous with the knob portion 74. The length of the linear base region 75 is slightly shorter than that of the first side portion 142 of the recess portion 60.

A space region is formed in the casing 71, a terminal 81 is arranged therein. A gap 82, which can receive therein the second extending portion 32 of the separator 30, is formed at the lower end of the base region 75 along the entire length thereof, and also, a gap 83, which can receive therein the first extending portion 31 of the separator 30, is formed in the tip end region 76. The distance $\alpha$ from the upper edge 32a of the second extending portion 32 of the separator 30 to the bottommost end of the protrusion 41 of the resin sheet 40 is set shorter than the distance $\beta$ between the upper edge of the gap 82 and the to-be-crimped portion 79 of the cell connector 70 by about 0.1 to 0.5 mm.

The terminal 81 is arranged at a portion where a part of the first extending portion 31 of the separator 30 can be sandwiched in a state in which the cell connector 70 is inserted in the recess portion 60 that is the cutout portion of the separator 30, and a conductive wire 84 (see FIG. 7) is connected to the rear end of the terminal 81.

In order to attach the cell connector 70 to the fuel cell 140, the cell connector 70 is attached such that it is inserted into the recess portion 60 as the cutout portion. For the attachment, the second extending portion 32 of the separator 30 is inserted into the gap 82 formed in the base region 75 of the cell connector 70, and in such a state, the cell connector 70 is slid downward such that it is pressed inside the recess portion 60, using the second extending portion 32 as a guide portion. Through the oblique downward movement of the cell connector 70, the tip end 77 of the tip end region 76 of the cell connector 70 reaches a region of the first extending portion 31 of the separator 30, and when the cell connector 70 is further slid, the first extending portion 31 is received within the tip end region 76, and in such a state, the terminal 81 in the cell connector 70 is electrically connected to the first extending portion 31 of the separator 30.

As described above, the distance $\alpha$ from the upper edge 32a of the second extending portion 32 of the separator 30 to the bottommost end of the protrusion 41 of the resin sheet 40 is set shorter than the distance $\beta$ between the upper edge of the gap 82 and the to-be-crimped portion 79 of the cell connector 70 by about 0.1 to 0.5 mm. Therefore, in a state in which the cell connector 70 is inserted in the recess portion 60 formed in the fuel cell 140, the to-be-crimped portion 79 of the cell connector 70 is pressed downward, that is, toward the second extending portion 32 of the separator 30 due to the elastic force of the protrusion 41 of the resin sheet 40. Due to such pressure, the cell connector 70 is attached to the fuel cell 140 in a stable posture.

In addition, the proximal side of the protrusion 41 of the resin sheet 40 is sandwiched on its right and left sides by the flat planes 17, 17 of the pair of separators 20, 30, and thus, the posture of the protrusion 41 can also be maintained stably.

As described above, in the fuel cell 140 of this embodiment, a part of the insulating resin sheet 40, which is usually arranged on the outer side (outer periphery) of the membrane electrode assembly (MEA) 10 serving as a power-generating module, along the plane direction thereof is made to protrude in the plane direction, and the lower end side of the protrusion 41 is used as a pressing member for pressing the cell connector 70 to be attached to the fuel cell 140 so that the stability of the cell connector 70 is secured. Therefore, in this embodiment, an insulating resin sheet that is commonly used for typical fuel cells can be used as it is so as to secure the stability of the cell connector, without requiring a thick resin sheet like the conventional means for attaching a cell connector. Consequently, the stability of the cell connector can be secured without the physical size of the fuel cell 140 increased.

In addition, in this embodiment, as illustrated in FIG. 2, since the aforementioned recess portion 60 in which the cell connector is adapted to be inserted is formed using an empty, space near the outlet-side fuel gas manifold 54 and a new space for providing the recess portion 60 is not required, space saving of the fuel cell 140 can be achieved, it should be noted that although the recess portion 60 is formed near the outlet-side fuel gas manifold 54 in FIG. 2, if an area of the opening of the inlet-side fuel gas manifold 51 is reduced, a space can be similarly secured near the inlet-side fuel gas manifold 51, and thus, the recess portion 60 in which the cell connector is adapted to be inserted can be formed around the inlet-side fuel gas manifold 51.

Further, in this embodiment, the angle of the tip end 77 along the direction of insertion of the cell connector 70 into the recess portion 60 is acute, and thus, the degree of interference between the tip end region 76 of the cell connector 70 and the tip end of the first extending portion 31 of the separator 30 during the insertion can be reduced, and thus, the cell connector 70 can be smoothly inserted into the recess portion 60.

In this embodiment, although the second extending portion 32 of the separator 30 is used as a guide portion for attaching the cell connector 70 to the fuel cell 140, it is also possible to form a member corresponding to the second extending portion 32 using a different member from the separator 30 under the condition that the entire thickness is not increased. Further, although a member that presses the cell connector 70 from above is formed using a part of the insulating resin sheet 40 for sealing a space between the pair of separators 20, 30, it is also possible to arrange another resin sheet that is different from the insulating resin sheet 40 between the pair of separators 20, 30 under the condition that the entire thickness is not increased.

Figure 10:
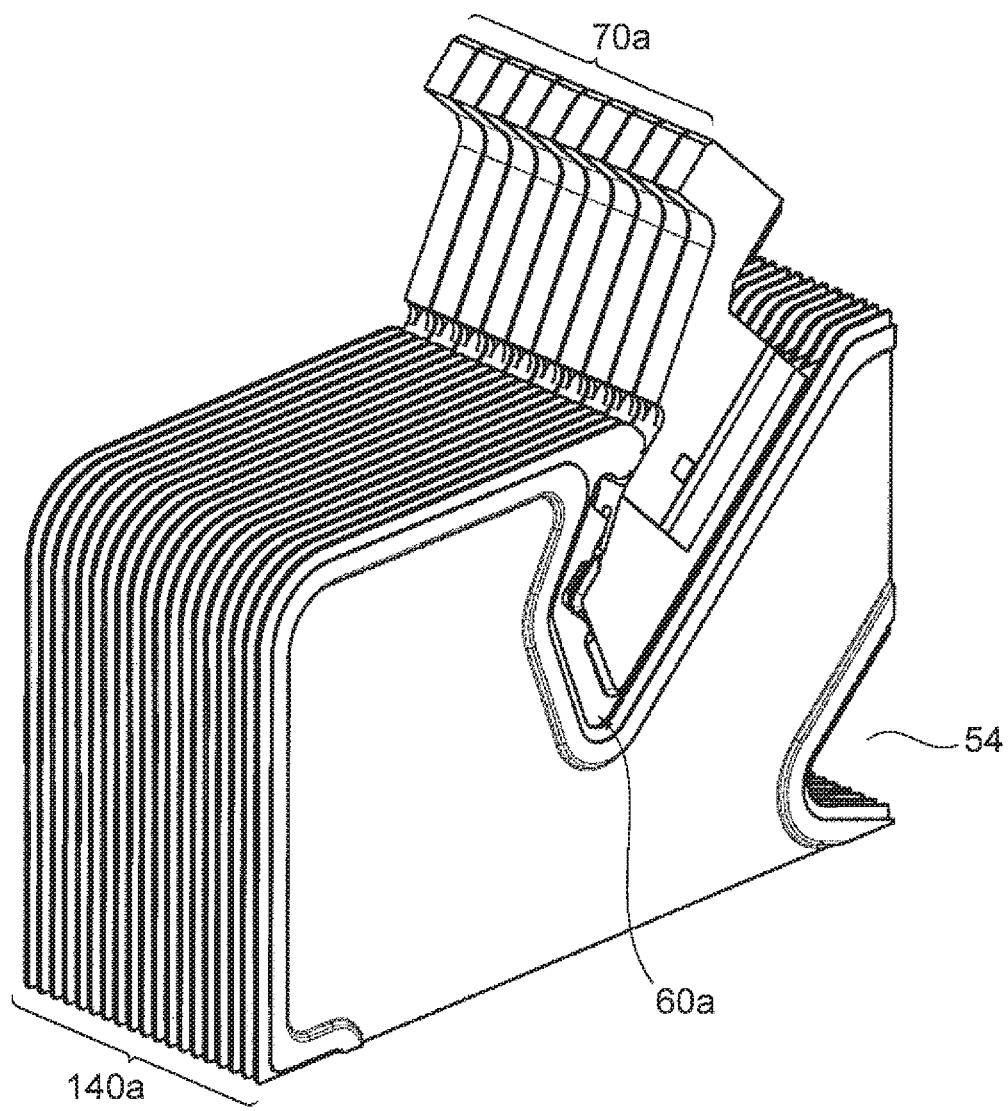
FIG. 10 is a perspective view of the periphery of a recess portion, in which a cell connector is adapted to be inserted, of a fuel cell device having a plurality of stacked fuel cells.

The embodiment described above with reference to FIGS. 2 to 9 illustrates a single fuel cell 140 and a single cell connector 70. However, in a structure of the fuel cell stack 100 including a plurality of fuel cells 140 like the fuel cell system 100a illustrated in FIG. 1, as illustrated in FIG. 10, recess portions 60a with the same shape are formed in the same positions of the fuel cells that form a fuel cell group 140a, and a cell connector 70a in which the same number of cell connectors 70 as that of the recess portions 60a are arranged in parallel is inserted in the recess portions 60a.

Finally, the results of comparison between the actual example of the fuel cell 140 in accordance with this embodiment and a fuel cell having a connector attached thereto in the conventional fashion as described in JP 2007-200633 A will be described. For the fuel cell 140 in accordance with this embodiment, the resin sheet 40 with a thickness of 0.2 mm was used, and thus, the stability of the cell connector 70 attached to the fuel cell 140 was secured. The thickness of the fuel cell 140 was 1.0 mm. Meanwhile, in order to attach a cell connector to a fuel cell as in the method described as the conventional art, a resin frame with a thickness of 1.0 mm for forming the aforementioned mating part would be needed, and consequently, the thickness of the fuel cell became 1.8 mm even when the same membrane electrode assembly (MEA) of the fuel cell 140 in accordance with this embodiment was used. Accordingly, it was found that using the means for attaching the cell connector 70 in accordance with this embodiment can obtain a fuel cell with the same power-generation level as that of the conventional fuel cell without increasing the thickness of the fuel cell to a thickness of greater than that originally required to generate power.

DESCRIPTION OF SYMBOLS

100a Fuel cell system
100 Fuel cell stack
140 Fuel cell
141 Top side of fuel cell
142 First side portion that forms recess portion
143 Second side portion that forms recess portion
144 Third side portion that forms recess portion
10 Membrane electrode assembly (MEA)
17 Flat plane of separator
18 Expanded open portion around separator
19 Gap of expanded open portion between resin sheet and separator
20, 30 Pair of separators
40 Insulating resin sheet
51 Inlet-side fuel gas manifold
52 Cooling-medium outlet manifold
53 Inlet-side oxidant gas manifold
54 Outlet-side fuel gas manifold
55 Cooling-medium inlet manifold
56 Outlet-side oxidant gas manifold
60 Recess portion in which cell connector is adapted to be inserted
70 Voltage-detection cell connector
81 Terminal
84 Conductive wire for connection to terminal
31 First extending portion of separator 30
32 Second extending portion of separator 30
41 Protrusion that protrudes into recess portion 60 of resin sheet
71 Flat casing
73 Body portion of casing
74 Knob portion of casing
75 Linear base region
76 Tip end region
77 Tip end of tip end region
79 To-be-crimped portion
82 Gap formed at lower end of base region
83 Gap formed in tip end region
$\alpha$ Distance from upper edge of second extending portion of separator to protrusion of resin sheet
$\beta$ Distance between upper edge of gap 82 and to-be-crimped portion 79 of cell connector
S Power-generating region

What is claimed is:

1. A fuel cell adapted to have attached thereto a voltage-detection cell connector used for detecting a cell voltage, the fuel cell comprising:
    a membrane electrode assembly;
    a pair of separators sandwiching the membrane electrode assembly therebetween;
    a recess portion that receives the cell connector;
    a plate-like guide portion located on a side of the recess portion, the plate-like guide portion extending in a direction of insertion of the cell connector and serving as a guide for the cell connector when the cell connector is inserted into the recess portion;
    a resin sheet arranged between the pair of separators; and
    a pressing member formed of a part of the resin sheet, the pressing member protruding into the recess portion at a position that is opposite the guide portion and at which the pressing member is adapted to press a part of the cell connector inserted into the recess portion toward the guide portion.

2. The fuel cell according to claim 1, wherein opposite sides of a proximal side of a portion of the resin sheet that forms the pressing member are sandwiched between the pair of separators.

3. The fuel cell according to claim 1, wherein the pressing member is formed of a part of an insulating resin sheet arranged between the pair of separators to seal a space between the pair of separators.

4. The fuel cell according to claim 1, wherein the guide portion is formed of a part of the separator.

5. The fuel cell according to claim 1, wherein:
    at least a fuel gas manifold and an oxidant gas manifold are provided on a peripheral edge of the fuel cell, and
    the recess portion is arranged in proximity to the fuel gas manifold.

6. A fuel cell device comprising a stack of a plurality of the fuel cells according to claim 1.

* * * * *